(No Model.)

G. REILLY.
NUT LOCK.

No. 577,174.  Patented Feb. 16, 1897.

Witnesses

Inventor
George Reilly.

By his Attorneys,
C. A. Snow & Co.

UNITED STATES PATENT OFFICE.

GEORGE REILLY, OF MARFA, TEXAS.

NUT-LOCK.

SPECIFICATION forming part of Letters Patent No. 577,174, dated February 16, 1897.

Application filed April 16, 1896. Serial No. 587,795. (No model.)

*To all whom it may concern:*

Be it known that I, GEORGE REILLY, a citizen of the United States, residing at Marfa, in the county of Presidio and State of Texas, have invented a new and useful Nut-Lock, of which the following is a specification.

This invention relates to new and useful improvements in nut-locks especially adapted for use on railways; and it has for its object to provide a device of this character embodying in its construction simple and efficient means for securely retaining the nut upon the bolt, whereby the gradual loosening of such nut without the aid of a suitable implement will be prevented.

To this end the invention consists, substantially, in the construction, combination, and arrangement of parts as, will be hereinafter fully illustrated, described, and claimed.

Figure 1:
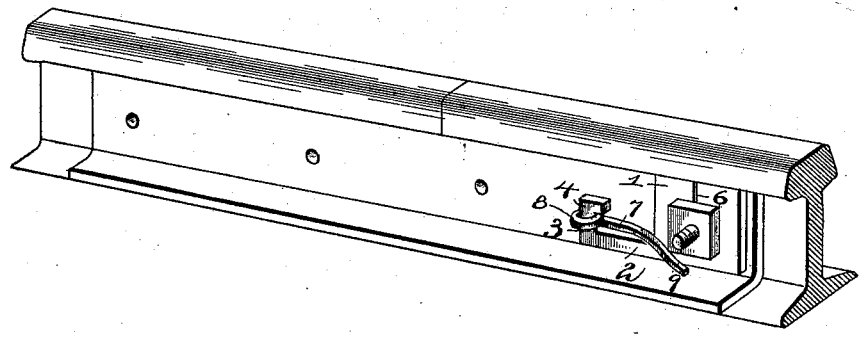
Figure 2:
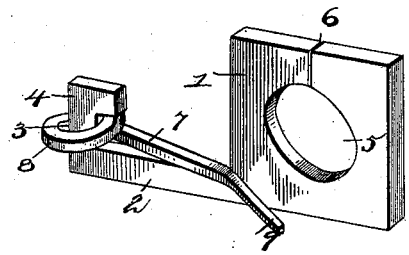
Figure 3:
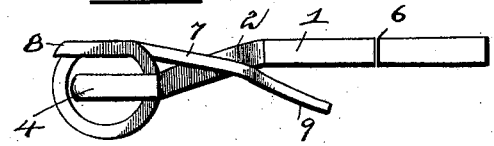
Figure 4:
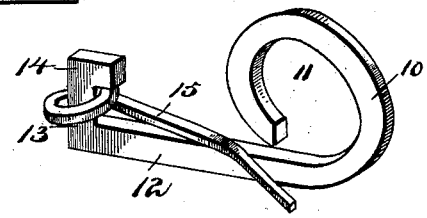

In the accompanying drawings, Figure 1 is a perspective view of a nut-lock constructed in accordance with the present invention and illustrating the same in applied position. Fig. 2 is an enlarged perspective view of the lock removed. Fig. 3 is a top plan view thereof. Fig. 4 is a perspective view of a differently-constructed form of the lock.

Similar numerals of reference indicate corresponding parts throughout the figures.

Referring to the drawings, 1 designates a lock-body formed of any suitable spring material and constructed in any desired shape. The body 1 is provided with a shank 2, extending outwardly therefrom, and formed integral with such shank, at right angles to the same, is a spindle 3, provided with a head 4. The body 1, shank 2, and spindle 3 are formed of a single piece, and, as clearly illustrated, said body 1 has an opening 5, adapted to receive any ordinary bolt. The body 1, at one side of the opening 5, is split, as at 6, in order to permit of expansion and contraction, and also allowing the lock to be curved, so that the pressure of the nut on the lock will impart to the shank 2 its desired pressure against the fish-plate.

Loosely mounted upon the spindle 3 is a latch 7, said latch being constructed of any suitable material and having one of its ends coiled to form an eye 8, which encircles the said spindle 3. The extremity of the eye 8 is flattened at one of its sides and lies upon the main portion of the latch 7 in vertical alinement with one side thereof. The opposite end 9 is bent at an obtuse angle to the said main portion of the latch and when in the position shown in Fig. 1 projects under the nut on the bolt and prevents the same turning, thereby securely locking such nut.

In Fig. 4 I have illustrated a differently-constructed form of lock, which comprises a strip bent at one of its ends to form a body 10, having an opening 11, through which the bolt may pass, the extremity of said bent end being spaced a slight distance from the main portion to permit of expansion and contraction. The said main portion of the strip forms a shank 12, the end of which, opposite to the body 10, is bent at right angles and provides a spindle 13, having a head 14, the shank 12, spindle 13, and head 14 being essentially the same as shown in Figs. 1, 2, and 3. The latch 15 in this form of lock is applied to the spindle 13, and its construction and operation are precisely the same as the latch 7.

From the foregoing the advantages of the herein-described nut-lock will be apparent to those skilled in the art. In order to apply the same, the lock-body is placed against the fish-plate of the rails, the bolt connecting such fish-plate with the rail passing through the opening in the body. A nut is then screwed upon the bolt, and when the same contacts with the lock it imparts to the shank the desired pressure against the fish-plate. A suitable implement is inserted between the head of the spindle and the fish-plate, and by reason of the shank being formed of a spring material such shank will be forced away from the fish-plate. This will permit the eye of the latch being rotated on the spindle and said latch easily passed under the nut on the bolt, as clearly shown in Fig. 1, and when the implement has been removed from between the head and the fish-plate the shank will immediately return against the latter. From the fact that the extremity of the eye 8 of the latch is in vertical alinement with one side of the main portion of said latch and is flat at one of its sides, such flattened side of the extremity will be pressed against the fish-plate and normally held in contact therewith by the shank of the lock-body, so as to retain the latch in locked position. Thus it is evident that the latch will always remain under the nut on the bolt and securely hold the same against removal.

To remove the nut, it is simply necessary to reverse the operation just described, when the same may be easily unscrewed from the bolt.

Having thus described my invention, what I claim as new is—

1. A nut-lock, comprising a lock-body formed of spring material having an opening adapted to receive a bolt and a shank extending from said lock-body, a spindle projecting at right angles to the shank and provided with a head, and a latch having one of its ends coiled to form an eye, said eye encircling the spindle of the shank and having its extremity flattened at one side and lying upon the main portion of said latch in vertical alinement with one side of the same, said flattened side of the extremity being adapted to be pressed against the body to which the lock is applied and held in contact therewith by the shank of the lock-body so as to retain the latch in locked position, and the other end of the latch bent at an obtuse angle to the main portion thereof and normally lying under the nut on the bolt to lock the same, substantially as set forth.

2. A nut-lock, comprising a strip bent at one of its ends to form a lock-body having an opening adapted to receive a bolt and a shank extending from said lock-body, a spindle projecting at right angles to the shank and provided with a head, and a latch having one of its ends coiled to form an eye, said eye encircling the spindle of the shank and having its extremity flattened at one side and lying upon the main portion of said latch in vertical alinement with one side of the same, said flattened side of the extremity being adapted to be pressed against the body to which the lock is applied and held in contact therewith by the shank of the lock-body so as to retain the latch in locked position, and the other end of the latch bent at an obtuse angle to the main portion thereof and normally lying under the nut on the bolt to lock the same, substantially as set forth.

In testimony that I claim the foregoing as my own I have hereto affixed my signature in the presence of two witnesses.

GEORGE REILLY.

Witnesses:
T. E. GILLEP,
ROBT. HICKS.